W. A. SMITH.
MACHINE FOR LACING SHOE UPPERS.
APPLICATION FILED FEB. 5, 1908.

1,075,511.

Patented Oct. 14, 1913.

Witnesses
Edward S. Day
N. D. McPhail

Inventor
Willard A. Smith
by Phillips Van Everen & Fish
Atty.

W. A. SMITH.
MACHINE FOR LACING SHOE UPPERS.
APPLICATION FILED FEB. 5, 1908.

1,075,511.

Patented Oct. 14, 1913.
6 SHEETS—SHEET 3.

W. A. SMITH.
MACHINE FOR LACING SHOE UPPERS.
APPLICATION FILED FEB. 5, 1908.

1,075,511.

Patented Oct. 14, 1913.

Witnesses
Edward S. Day
N. D. McPhail

Inventor
Willard A. Smith
by
Phillips Van Everen & Fish
Attys.

UNITED STATES PATENT OFFICE.

WILLARD A. SMITH, OF MELROSE, MASSACHUSETTS, ASSIGNOR TO UNITED SHOE MACHINERY COMPANY, OF PATERSON, NEW JERSEY, A CORPORATION OF NEW JERSEY.

MACHINE FOR LACING SHOE-UPPERS.

1,075,511.            Specification of Letters Patent.        Patented Oct. 14, 1913.

Application filed February 5, 1908. Serial No. 414,304.

*To all whom it may concern:*

Be it known that I, WILLARD A. SMITH, citizen of the United States, residing at Melrose, in the county of Middlesex and State of Massachusetts, have invented certain new and useful Improvements in Machines for Lacing Shoe-Uppers; and I do hereby declare the following to be a full, clear, and exact description of the invention, such as will enable others skilled in the art to which it appertains to make and use the same.

The invention relates to machines for lacing together the eyeleted quarters of shoe uppers preparatory to placing them on the last for the lasting or other subsequent operations.

In accordance with one of the principal features of the invention, the uppers to be laced are presented to the lace inserting mechanism by devices which bring them successively into position to be acted upon by the lace inserting mechanism. These devices in their preferred form consist of a series of two or more upper carriers which are brought successively into position to present the upper carried thereby to the lace inserting mechanism, and after the lacing operation has been completed are moved away from the lace inserting mechanism and brought to a position where the laced upper may be readily removed, and an unlaced upper supplied to the carrier. By thus presenting the uppers to the lace inserting mechanism, the operator is enabled to remove the laced upper and supply an unlaced upper to a carrier during the time that the lacing mechanism is operating to insert the lace in an upper carried by another of the upper carriers. The rapidity with which the lacing operations may follow one another is therefore increased, since the delay incident to removing the laced upper and presenting an unlaced upper to the lace inserting devices between successive lacing operations is eliminated. While this feature of the invention may be combined with advantage with various forms or types of lace inserting mechanism, it may be employed with special advantage in presenting uppers to lace inserting devices which operate to insert the lacing in the eyelet holes successively. With this type of lace inserting mechanism the time required for the performance of the lacing operation is practically that required for the operator to remove a laced upper from an upper carrier and supply an unlaced upper thereto, and therefore the operation of the lacing devices may be substantially continuous, the only interval between successive lacing operations being that required for moving one carrier away from and bringing another carrier to the lace inserting mechanism.

Further features of the invention contemplate the provision of devices for locating the pairs of eyelets of an upper so that the eyelets in each pair are brought into alinement and the different pairs of eyelets are accurately located to receive the devices which carry the lacing cord or thread through the eyelets during the lacing operation. These eyelet locating devices in their preferred form consist of a series of eyelet engaging spindles properly spaced to receive the pairs of eyelets of the upper, and so mounted that they may move or be moved out of the eyelets to permit the passage of the lacing through the eyelets during the lacing operation. These eyelet locating spindles enable the operator to quickly and accurately position the upper and also maintain the eyelets in accurate position until the lacing has been inserted therein. The eyelet locating spindles are preferably mounted in adjustable blocks, which are so connected that they may be simultaneously adjusted to vary the spacing of the spindles for different spacings of eyelets. This manner of mounting the spindles forms a further feature of the invention which enables the operator to quickly and conveniently adjust the spacing of the locating spindles to correspond with the spacing of the particular upper which is to be laced.

The features of the invention relating to the devices for locating the pairs of eyelets of the upper may be embodied with advantage in constructions which do not embody the features relating to the presenting of the uppers to the lace inserting mechanism by a plurality of traveling upper carriers, and may be embodied with especial advantage in machines in which the lace inserting mechanism acts to insert the lace in the pairs of eyelets successively. In the latter case, means are provided for intermittently advancing the eyelet locating devices to bring the pairs of eyelet holes in the upper successively into register with the device which passes the lacing cord through the eyelet holes.

In embodying the various features of the invention in a machine which will operate to lace together the sides of the uppers in rapid succession, I have employed a lace inserting mechanism which acts to form a series of chain stitches through the pairs of eyelet holes in the uppers, and certain features of the invention relate to the thread handling devices of this chain stitch forming mechanism. This mechanism includes a hooked needle and a looper for laying the thread in the hook of the needle, and one of the features of invention relating to this mechanism consists in providing means for severing the thread between the looper and the work at the end of the lacing operation.

A further feature consists in also providing means for holding the end of the supply thread after the thread has been severed between the looper and the work.

These features are of importance in enabling the lacing operations to be performed in rapid succession, since the lacing is severed from the supply thread automatically after the lacing operation has been completed, and the laced upper may therefore be moved away from the lace inserting mechanism immediately upon the completion of the lacing operation. The end of the supply thread is also properly held to enable the succeeding lacing operation to be begun immediately and without any attention on the part of the operator.

Further features of the invention relate to the means for controlling the operation of the lace inserting mechanism in such manner that it does not begin to operate until the upper is brought into proper position with relation to it, then begins to operate and continues in operation until the lacing has been inserted in the requisite number of eyelet holes, and then is thrown out of operation and remains out of operation until again thrown into operation by the bringing of an upper into proper position.

The features above referred to, as well as further features of invention referred to in the claims, will be understood from an inspection of the accompanying drawings, in which—

Fig. 5ª is a detail plan view of the stop lever shown in Fig. 5.

In the machine shown the lace inserting mechanism is constructed to insert the lacing in the eyelet holes of the upper successively by forming a series of chain stitches through the succeeding pairs of eyelets. The uppers are presented to the lace inserting mechanism by a plurality of upper carrying devices which are brought by the movement of the carrier on which they are mounted successively into position to present the upper to the lace inserting mechanism, one upper carrier being in position where the operator may remove a laced upper therefrom and supply an unlaced upper thereto while another upper carrier is in position to present the upper carried thereby to the lace inserting mechanism. As shown, the upper carriers are in the form of two slides 1 and 2, which are mounted in a guideway extending diametrically across the rotary disk or table 3 which forms the carrier for bringing the upper carriers successively into position to receive the uppers, and into position to present the uppers to the lace inserting mechanism. The carrying disk 3 is secured upon the upper end of a vertical shaft 4 which is connected through beveled gears 5 and 6 with an intermittently operating driving shaft 7. When the mechanism which operates the driving shaft 7 is thrown into operation, the shaft makes a single revolution and then the driving mechanism is thrown out. Since the gear 6 is one-half the diameter of the gear 5, this revolution of the shaft 7 turns the carrier 3 through a half revolution, thus bringing the upper carrier which has been in position to present the upper to the lace inserting mechanism into position to be supplied with a new upper, and bringing the upper carrier which has been in position to receive an upper, into position to present the upper to the lace inserting mechanism.

Figures 1, 12, 13:
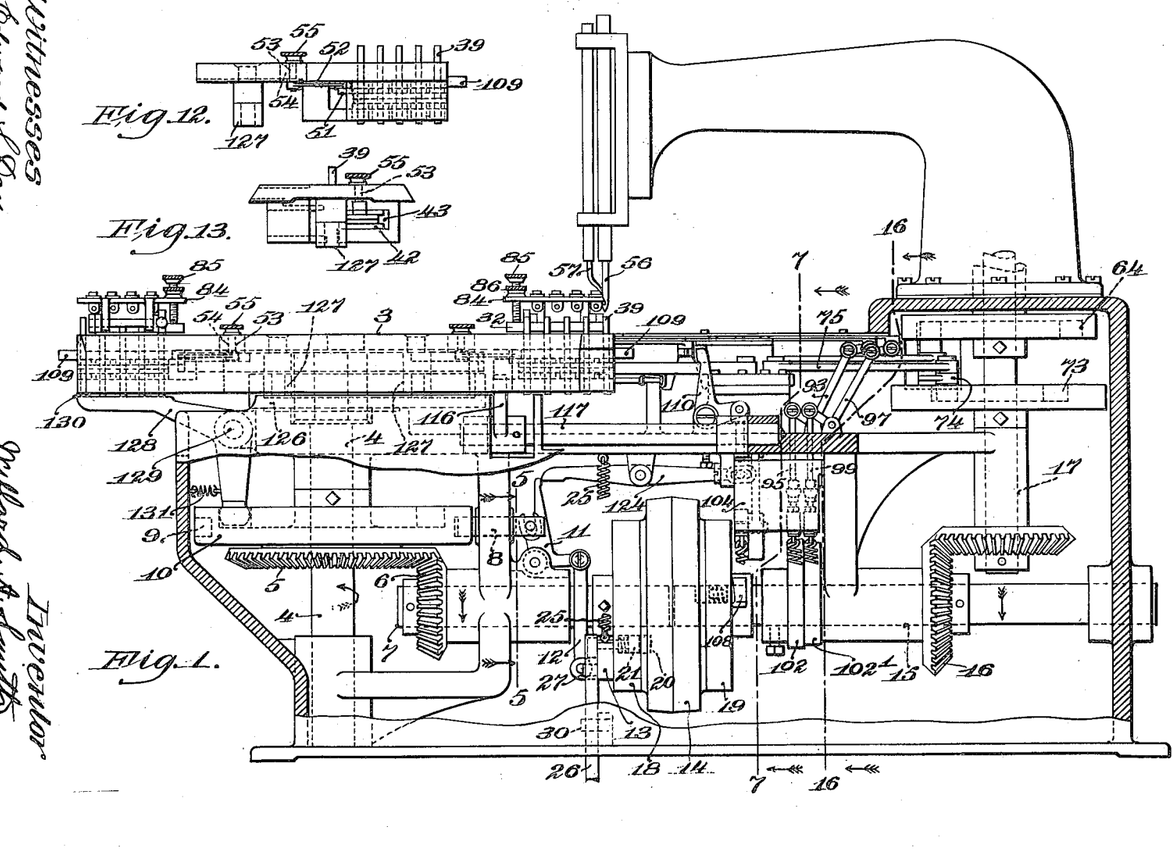
Figure 1 is a side elevation, partly in section, showing a machine embodying the various features of the invention in the forms in which I prefer to use them.
Fig. 12 is a side elevation of one of the upper carriers.
Fig. 13 is an end view of the same looking toward the right in Fig. 12.
Figures 3, 4, 5, 5A, 6:
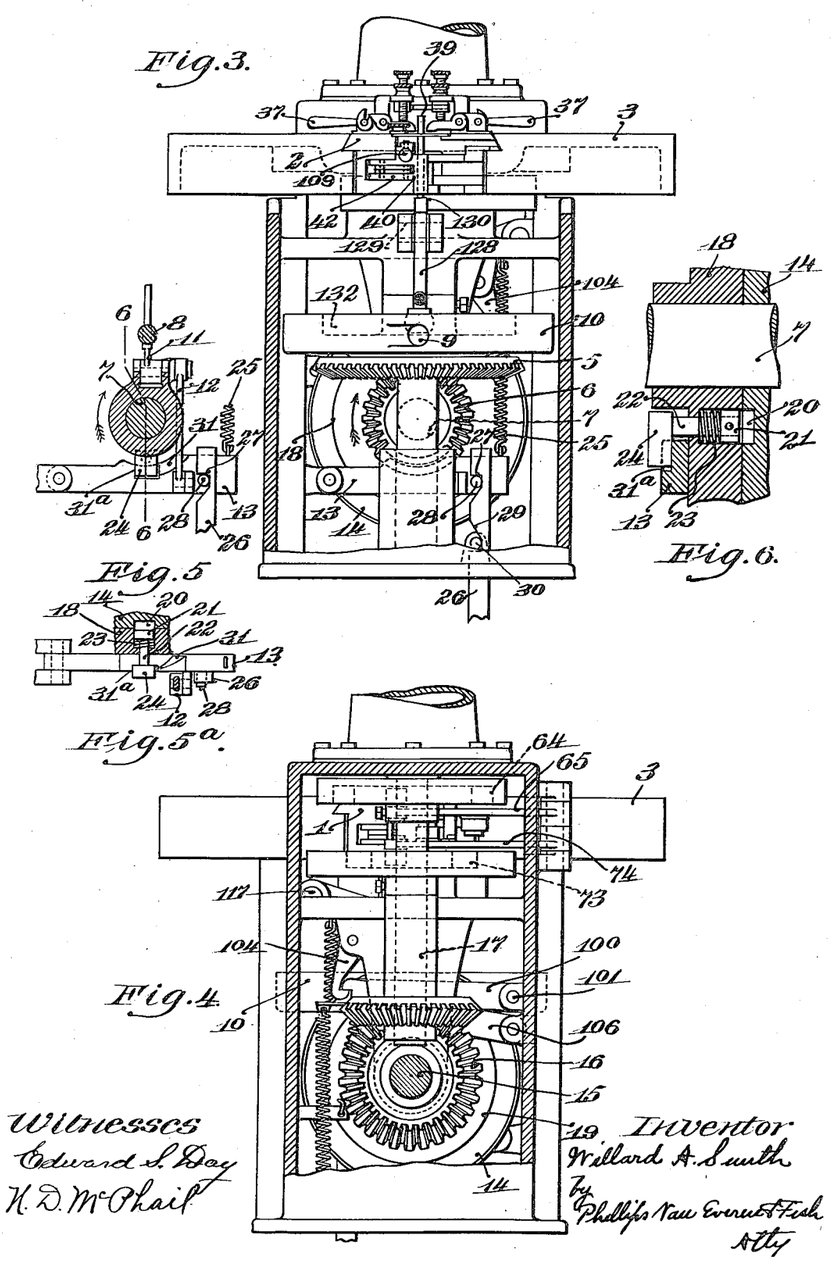
Fig. 3 is an end elevation looking toward the right in Fig. 1, with the end of the frame broken away.
Fig. 4 is an end elevation looking toward the left in Fig. 1 with the end of the frame broken away.
Fig. 5 is a sectional detail on line 5—5, Fig. 1.
Fig. 6 is an enlarged sectional detail on line 6—6, Fig. 5.

The shaft 4 and carrier 3 are locked in position by a locking bolt 8 arranged to engage holes 9 formed on diametrically opposite sides of a cam disk 10 which is secured to the shaft 4. The locking bolt is connected by a pin and slot connection with one arm of a bell crank lever 11, the other arm of which is connected by a link 12 with a lever 13 which controls the stopping and starting of the drive shaft 7 (Figs. 1, 5 and 5ª). The means for operating the shaft 7 comprises a pulley 14 mounted upon the end of the shaft 7, and the adjacent end of a second shaft 15 which is mounted in line with the shaft 7 and is connected through beveled gears 16 with the shaft 17 which operates certain parts to be described. The pulley 14 is held in position upon the ends of the shafts 7 and 15 between disks 18 and 19 which are secured to the shafts 7 and 15 respectively. The hub of the pulley 14 is provided with a recess 20 (Figs. 5ª and 6) adapted to be engaged by a clutch block 21 formed on the end of a bolt 22, which is mounted within a recess in the disk 18, and is forced in a direction to enter the recess 20 by a spring 23. The clutch block 21 is normally held within the recess in the disk 18 by the controlling lever 13 which lies between the face of the disk 18 and a head 24 formed on the outer end of the bolt 22, and holds the bolt in retracted position. The controlling lever is held in the position to prevent the engagement of the clutch block 21 with the recess in the disk 18 by a spring 25.

The controlling lever 13 is operated to release the clutch block 21 so that it may engage the recess 20 in the pulley 14 and thus connect the pulley with the shaft 7 by means of a bar 26 provided at its upper end with a shoulder 27 which overlies a pin 28 projecting from the side of the lever 13. The bar 26 is connected with a treadle (not shown) through which the operator may draw down the bar 26 when the carrier 3 is to be given a half revolution. When the bar 26 is drawn downward it swings the lever 13 downward and withdraws it from engagement with the head 24 on the bolt 22, so that the clutch block 21 may engage the recess 20 in the pulley 14. As the bar 26 moves downward, a cam surface 29 on the bar rides against a fixed pin 30 and moves the bar so that the shoulder 27 disengages the pin 28, thus allowing the lever 13 to return to normal position (Fig. 3). When the bolt 22 is released the clutch block 21 will ride against the hub of the pulley 14 until the recess 20 registers with the block, when the block will enter the recess. The disk 18 will now turn with the pulley until the disk has made a complete revolution. As the disk nears the end of its revolution, the head 24 on the bolt 22 will ride against the inclined cam surface 31 which is formed on the controlling lever 13, and thus the rod 22 will be retracted to disengage the clutch block 21 from the recess 20. The head 24 engages the shoulder 31ª and prevents overrunning of the disk 18. When the controlling lever 13 is operated as above described to connect the pulley 14 with the shaft 7, the locking pin 8 is withdrawn from the locking recess 9, and as the shaft 4 is revolved the pin rides against the periphery of the disk 10 until the pulley 14 is disconnected from the shaft 7 at the completion of a half revolution of the carrier 3, when the locking bolt will enter the recess 9, locking the carrier in position.

Each of the upper carrying slides 1 and 2 is provided with devices for engaging and positioning the pairs of eyelets through which the lace is to be inserted, and with holding devices for holding the upper in place upon the slide. The upper holding device consists of a clamp plate 32 mounted upon a pivot rod 33 which is mounted in a bracket 34 secured to the upper face of the slide. At one end the clamping plate is provided with a rearwardly projecting arm 35, through which the plate is operated to clamp the upper against the upper face of the slide or to release the upper. The rear end of the arm 35 is arranged to engage a locking disk 36 which is mounted on the bracket 34, and is provided with an operating handle 37. The disk is provided with a notch 38 arranged to engage the rear end of the arm 35. When the handle 37 is swung into the position indicated in the drawings, the disk 36 acts against the arm 35 to swing the clamping plate down against the upper and then to lock the plate in this position. When the handle 37 is swung up, the recess 38 engages the end of the arm 35, and then continued movement of the disk 36 swings the arm 35 downward, thus raising the clamping plate so that the upper may be removed and another upper placed in position.

Figures 7, 10, 11:
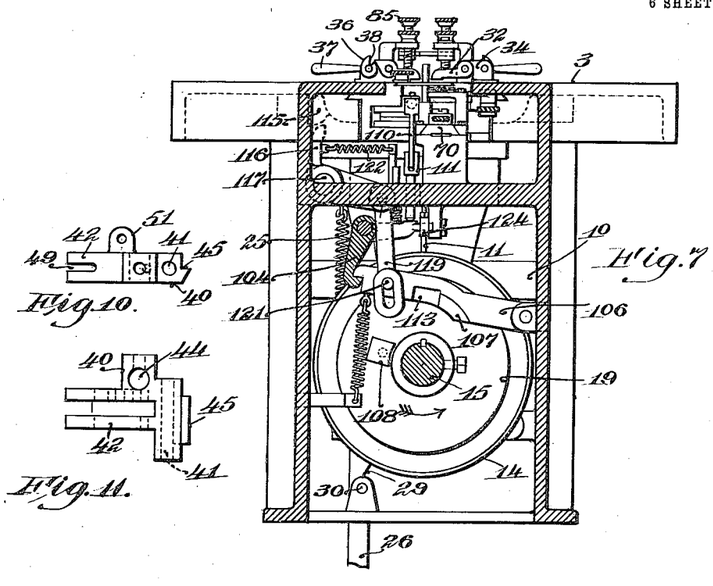
Fig. 7 is a sectional view on line 7—7, Fig. 1.
Fig. 10 is a detail plan view of one of the supports for the eyelet engaging spindles of the upper carrier.
Fig. 11 is a side elevation of the support shown in Fig. 10.
Figure 8:
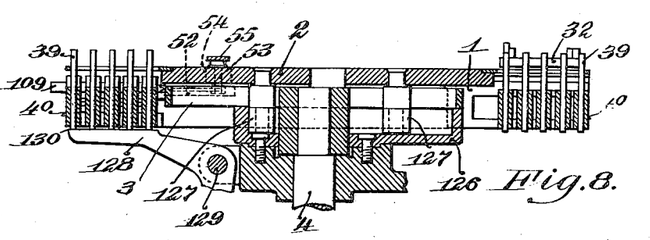
Fig. 8 is a sectional detail taken on a plane passing vertically through the center of the upper carriers and the carrier on which the upper carriers are mounted.
Figure 16:
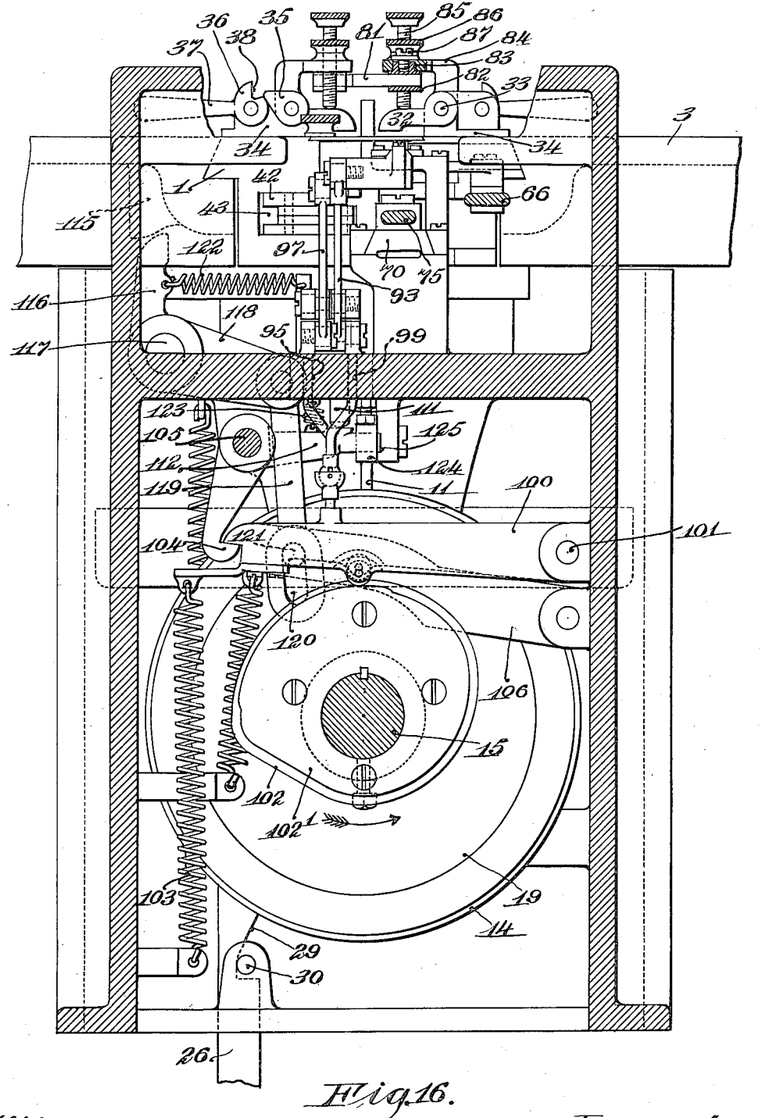
Fig. 16 is a vertical sectional view on an enlarged scale taken on line 16—16, Fig. 1.

The devices for engaging and positioning the pairs of eyelets on opposite sides of the upper and thus bringing the eyelets of each pair into proper alinement, and into position to be properly presented to the lace inserting mechanism, consist of a series of spindles 39 arranged to project beyond the face of the slide. In order that these positioning spindles may be adjusted for different spacings of eyelets, each spindle is mounted in a spindle carrying block 40, and these blocks are in turn adjustably mounted in the slide. The construction of these spindle carrying blocks is shown in Figs. 10 and 11. Each block is provided with a vertical socket 41 in which the eyelet locating spindle is frictionally held, and is provided with two laterally projecting arms 42 adapted to fit within a longitudinal recess 43 in the upper carrying slide (Figs. 13 and 16). Each block is also provided with a hole 44 through which extends a controlling bar to be hereinafter described. Each block is also provided with a tooth or shoulder 45 for coöperating with the pawl which moves the upper carrying slide to bring the pairs of eyelets successively into register with the lace inserting needle, as will be more fully described.

Figure 9:
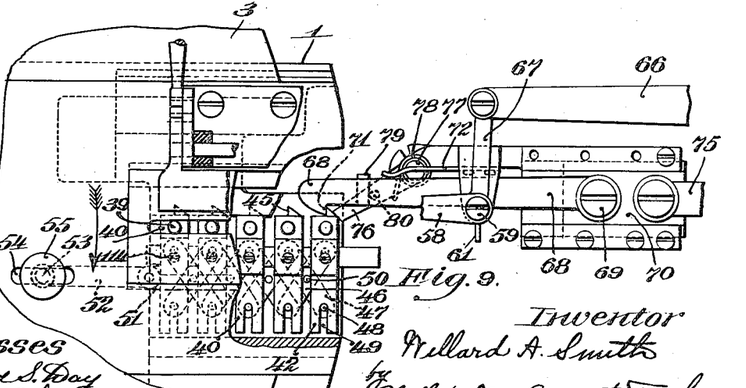
Fig. 9 is a detail plan view showing parts of the mechanism for feeding the uppers to the lace inserting mechanism, certain parts of the lace inserting mechanism being removed for the sake of clearness.
Figure 14:
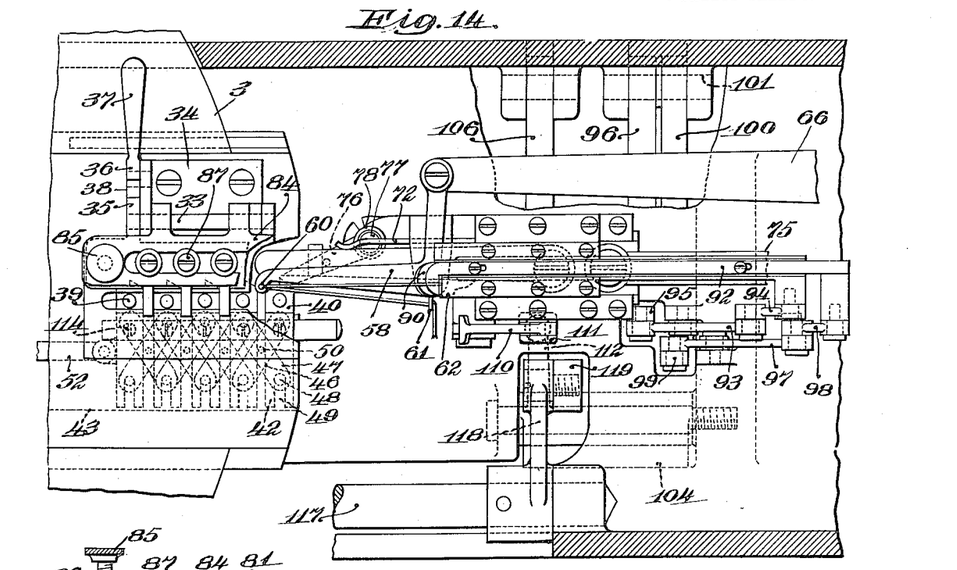
Fig. 14 is a detail plan view on an enlarged scale showing parts of the upper feeding mechanism and parts of the lace inserting mechanism, certain parts being broken away for clearness.
Figure 15:
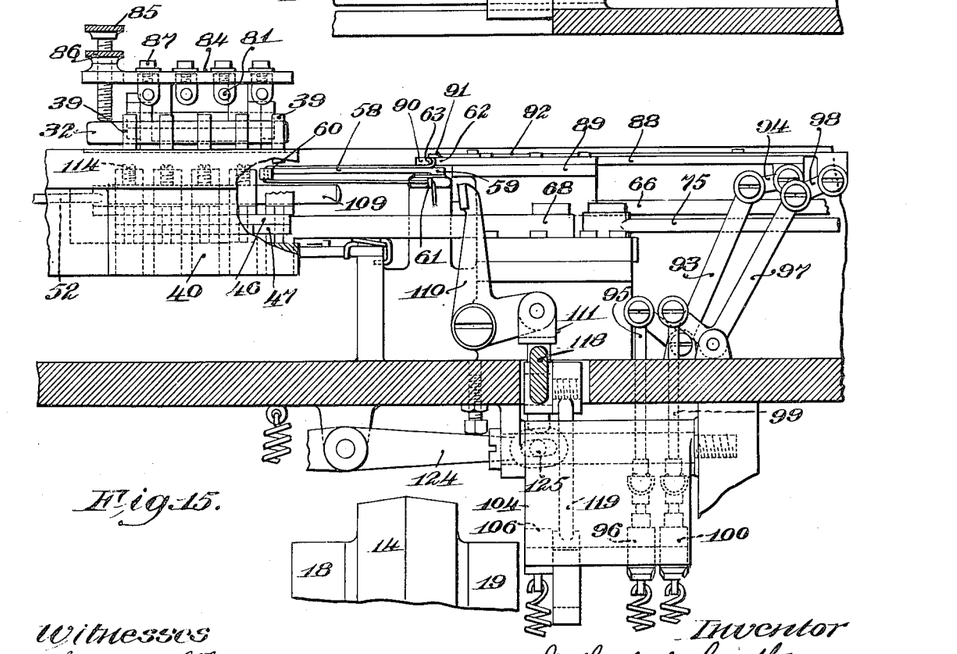
Fig. 15 is an elevation partly in section of the devices shown in Fig. 14.

The devices for adjusting the spindle carrying blocks for different spacings of eyelet holes consist of toggle links 46 and 47 connecting adjacent blocks and forming a lazy-tong construction through which the blocks may be simultaneously moved to vary the spacing between adjacent spindles, and at the same time a uniform spacing of the spindles be preserved (Fig. 9). The links 46 and 47 are mounted between the arms 42 of the blocks, and have their inner ends pivotally connected to the blocks, while their outer ends are provided with pins 48 which play in slots 49 in the outer ends of the arms 42. The links are arranged to cross each other as indicated, and are pivoted together at their centers as indicated at 50. The inner block 40 is provided with a lug 51 by which it is pivotally connected to one end of a link 52, the other end of which is connected with an adjusting pin 53. The lower end of the pin 53 is threaded in the end of the link 52, and the pin extends up through a slot 54 in the upper carrying slide, and is provided with a head 55 on its upper end. By turning the pin 53 and sliding it in the slot 54, the spacing of the eyelet locating spindles may be quickly changed to suit the spacing of the upper which is to be applied to the spindles, and then the spindles may be held in adjusted position by turning the pin 53 to clamp the same in adjusted position.

The mechanism for forming a series of chain stitches through the eyelet holes of the upper comprises a hooked needle 56 and a cast-off 57 which are operated in the usual and well-known manner by mechanism which is driven from the shaft 17, and is of well-known construction, and therefore has not been specifically shown. Coöperating with the hooked needle and cast-off is a thread carrier or looper 58, which consists of a lever pivoted at 59 and provided with a thread eye 60, through which the thread leads from a suitable thread supply and tension device. The thread from the thread supply passes through a thread guide 61, thence through the thread eye 60, and the end of the thread is held by a holding device comprising a fixed jaw 62 and a movable jaw 63. The thread looper 58 is operated upon the descent of the needle to place the thread which leads from the thread eye 60 to the thread holding device, or to the work, as the case may be, in the hook of the needle, so that the needle as it rises will carry a bight or loop in its hook to form the chain stitch, in the common and well-known manner. The proper movements are imparted to the thread carrier or looper by a cam 64 which is secured to the shaft 17, and acts upon a roll carried by a lever 65. The lever 65 is connected by a link 66 with an arm 67 secured to the thread carrier.

When the upper carrying slide is brought into position to present the upper carried thereby to the lace inserting mechanism, the upper carrying slide is moved forward to bring the locating spindle which engages the first pair of eyelets into register with the needle 56, so that on the first downward stroke of the needle it will pass through the first pair of eyelets, and on its return movement will draw a bight of thread through this pair of eyelets. In the downward movement of the needle it engages the locating spindle 39, and pushes the spindle down through its socket, the spindle being retained in the socket by frictional engagement therewith. Thus the pair of eyelets is accurately located in register with the needle, and is maintained in position until the eyelets are entered by the needle.

After the needle has drawn the loop through the first pair of eyelet holes, the upper carrying slide is moved forward to bring the next succeeding locating spindle and pair of eyelets into register with the needle, so that on the next descent of the needle it will pass through the succeeding pair of eyelets and push out the corresponding spindles, and on its next upward movement will draw a loop of thread through these eyelets and through the loop previously drawn. These operations will be repeated until the chain stitches have been formed through the desired number of eyelets, when the driving mechanism for the lace inserting devices will be thrown out of operation.

The means for bringing the eyelet locating spindles successively into register with the needle comprises a pawl 68 which is pivoted at 69 to a slide 70, and is provided at its forward end with a shoulder 71 adapted to engage the shoulders 45 on the spindle supporting blocks. The pawl is held yieldingly in position to engage the shoulders or teeth on the spindle carrying blocks by a spring 72. The slide 70 is reciprocated at proper intervals by means of a cam 73 which is secured to the shaft 17, and engages a roll on the end of a lever 74. The lever 74 is connected with the slide 70 by a link 75.

When the upper carrying slide is moved forward by the pawl 68, the eyelet locating spindle is accurately positioned with relation to the needle by means of a stop pawl 76 which is pivoted at 77 and is held yieldingly out of the path of the blocks 40 by a torsional spring 78. When the pawl 68 moves forward to feed the upper carrying slide, a lug 79 on the under side of the pawl acts against a pin 80 on the stop pawl 76 and swings the pawl forward so that it is brought into position to be engaged by the front side of the tooth 45 of that block on which the feed pawl is acting. When the advance movement of the block 40 is arrested by the stop pawl 76, the block is held accurately in position by the stop pawl 76 and feed pawl 68 which press firmly against the opposite faces of the corresponding tooth 45 (Fig. 9). The reciprocation of the feed pawl 68 is sufficient to cause the shoulder 71 on the end of the pawl to successively engage the teeth 45 on the spindle carrying blocks when the blocks are adjusted for the greatest spacing of the spindles, and the pawl will therefore act to advance the upper carrying slide and bring the locating spindles accurately into register with the needle, whatever the adjustment of the spindle carrying blocks.

In order that there may be the proper amount of slack in the lacing, the stitches are formed over a series of loop retaining pins 81 arranged to project horizontally above and between the locating spindles. These loop retaining pins are carried by a series of blocks 82, which are adjustably secured in a slot 83 formed in a supporting plate 84. The supporting plate 84 is pivotally mounted upon the rod 33 which carries the upper clamp, and may be adjusted vertically to vary the length of loop retained by the pins 81 by means of an adjusting screw 85. The screw 85 extends through the supporting plate 84, and rests on the top of the upper clamp 32. The screw is locked in adjusted position by means of a lock nut 86. By sliding the blocks 82 in the slots 83, the loop retaining pins 81 may be brought into proper position with relation to the eyelet locating spindles, and when so adjusted may be secured in position by clamping screws 87. As the upper carrying slide is advanced step by step in the formation of the chain stitches through the eyelet holes, the pins 81 are successively brought into position to support the loop of thread between successive eyelet holes so that a definite amount of slack is provided in each stitch, depending upon the adjustment of the plate 84 which carries the loop retaining pins.

When the last pair of eyelets through which the lacing is to be inserted is moved forward into position to register with the needle, a mechanism is tripped which throws the driving mechanism for the lace inserting devices out of operation after the needle has descended and has returned to its upper position and drawn a bight of the lacing through the last eyelet holes. During this last reciprocation of the needle a thread arm is operated to engage the thread between the thread carrier and the upper to draw off a loop of thread and to present the end of the loop to the thread holding devices and to sever the thread at this point. The thread arm for thus drawing off a loop of thread and presenting the thread to the holding device, consists of a slide 88 which is guided in a support 89 and is provided at its forward end with a laterally projecting finger 90. The front end of the finger 90 is curved or inclined so that as the thread arm moves forward the end of the finger will engage the thread which extends from the thread eye of the thread carrier to the upper, and will merely deflect the thread as the finger passes beyond it. The rear face of the thread finger is arranged at substantially right angles to the path of movement of the finger, so that when the thread arm is retracted, this face of the finger will engage the thread and draw off a loop of thread. The thread finger will continue to draw off thread from the thread supply until its rear face engages the shoulder 62 of the thread holder, at which time the rear face of the thread finger coöperates with the shoulder 62 to grip the thread, and forms the movable jaw 63 of the thread holder. As the thread is clamped between the thread finger and the jaw 62, a cutter blade 91 which is formed on the front end of a knife slide 92 acts to sever the thread between the thread holder and the upper. The lacing is thus severed from the thread supply so that the laced upper may be moved away from the lace inserting mechanism, and so that the end of the lace may draw through the hook of the needle and thus be drawn through the last previously drawn loop as the upper is carried away from the lace inserting mechanism. The end of the supply thread is also held in the thread holder, so that the thread leading from the thread holder to the eye of the thread carrier may be introduced into the hook of the needle at the beginning of the next lacing operation.

The thread arm 88 is reciprocated at the completion of the lace inserting operation through a bell crank lever 93, one arm of which is connected by means of a link 94 with the rear end of the thread arm, and the other arm of which is connected by a link 95 with a lever 96. The knife slide 92 is mounted upon the top of the thread arm 88, and is reciprocated with the thread arm through a bell crank lever 97, one arm of which is connected by a link 98 with the rear end of the knife slide, and the other arm of which is connected by a link 99 with a lever 100 similar to and arranged at the side of the lever 96. The levers 96 and 100 are both pivoted upon a stud 101 and are operated by cams 102, 102' respectively arranged to engage the rolls on the under sides of the levers. The cams are so shaped that on the forward stroke of the thread arm and knife, the knife is first moved forward beyond the rear face of the thread finger and then the finger and knife move together during the remainder of this forward stroke and during the return stroke of the arm. After the thread finger has clamped the thread against the fixed jaw 62 the rearward movement of the knife is continued to sever the thread.

Springs 103 are connected with the levers 96 and 100 to hold them in engagement with the peripheries of the cams 102, 102'. These levers are normally held in position to maintain the thread finger and knife in retracted position by means of a latch 104 which is pivoted at 105 and is provided with a shoulder at its lower end adapted to engage and support the outer ends of the levers. When the last pair of eyelet holes through which the lace is to be inserted is brought into register with the needle, the latch 104 is tripped to release the levers 96 and 100. At the same time the mechanism which disconnects the lace inserting mechanism from its driving mechanism is tripped, and thereafter the shaft 15 to which the cams 102 and 102' are secured makes a single revolution and then stops. During this revolution the levers 96 and 100 are operated to reciprocate the thread arm and knife in the manner above described, the levers being brought back to position to be engaged by the latch 104 at the end of the revolution.

The shaft 15 through which the lace inserting devices are operated is connected and disconnected from the pulley 14 by a controlling lever 106 which is provided with an inclined cam surface 107 arranged to coöperate with a clutch bolt 108 in a manner similar to that in which the controlling lever 13 coöperates with the clutch bolt 22. The clutch bolt 108 is mounted in the disk 19 which is secured to the shaft 15, and is provided with a clutch block on its inner end arranged to be engaged with and disengaged from a recess in the hub of the pulley 14 in the manner already described with relation to the clutch block 21 and recess 20.

During the operation of the lace inserting mechanism the controlling lever 106 is supported in position with the cam 107 out of the path of the head on the clutch bolt 108 by the latch 104 already described. When the last pair of eyelets through which the lace is to be inserted is moved into register with the needle 56, a bar 109 which projects from the end of the upper carrying slide strikes against the upper end of a bell crank lever 110 and rocks said lever about its pivot. The other end of the bell crank lever is connected to the upper end of a plunger 111, the lower end of which rests upon an arm 112 projecting inward from the latch 104. When the bell crank lever 110 is operated by the bar 109, the plunger 111 is depressed, thus operating the latch 104 to release the controlling lever 106 as well as the levers 96 and 100, as above described. The controlling lever 106 then swings downward into position to bring the cam 107 into the path of the head on the clutch bolt 108. The parts are so timed that the latch 104 will be thus operated just after the head of the clutch bolt 108 passes under the cam surface 107, and therefore the shaft 15 will be turned through nearly a revolution after the latch 104 has been tripped before the head of the bolt 108 rides up the cam surface 107 and disconnects the shaft 15 from the pulley 14. A shoulder 113 may be formed at the end of the cam surface 107 after the clutch bolt has been disengaged from the pulley.

The bar 109 which controls the throwing of the lace inserting mechanism out of operation extends through the holes 44 in the spindle carrying blocks 40, and may be secured to any one of the blocks by tightening the corresponding set screw 114. The bar may be provided with a notch or recess indicating the point on the bar which should be engaged by the securing set screw, and the length of the bar should be such that when the spindle carrying block to which the bar is secured is moved into position to bring its eyelet locating spindle into register with the needle, the end of the bar will engage and operate the tripping lever 110. By shifting the bar and connecting it with any one of the blocks 40, the bar may be adjusted so that the lace inserting devices will be thrown out of operation after the lace has been inserted in any desired number of eyelets. By connecting the bar with the spindle carrying block corresponding to the eyelets through which the last loop is to be drawn, the bar is maintained in proper relation to the eyelet locating spindle when the blocks are adjusted for different spacings of eyelets.

When the lace inserting devices are thrown out of operation in the manner above described, they remain out of operation until the controlling lever 106 is swung up into the position indicated in the drawings to release the clutch bolt 108 and allow it to connect the driving pulley with the shaft 15. The lever 106 is thus operated to throw the lace inserting mechanism into operation as the carrier 3 which carries the upper carrying slides completes a half revolution and brings one of the upper carrying slides into position to present the upper carried thereby to the lace inserting devices. The means for thus operating the lever 106 consists of two cams 115 formed on the under side of the carrying table 3 and arranged to act upon the upper end of an arm 116 which is secured to a rock shaft 117 (Figs. 1, 7 and 16). The rock shaft 117 is provided with a second arm 118 to the outer end of which is pivoted a link 119. The lower end of the link is provided with a slot 120 which is engaged by a pin 121 projecting from the side of the lever 106. As the carrier 3 completes a half revolution, one of the cams 115 passes by the end of the arm 116, and in so doing swings the arm backward against the tension of the spring 122, and lifts the link 119. At this time the pin 121 engages the lower end of the slide 120, and the upward movement of the link lifts the lever 106 into position to be engaged by the latch 104. At this time the latch 104 is in its inner position, since the bar 109 which operated upon the bell crank lever 110 to trip the latch has been carried by the revolution of the carrier 3 away from the end of the bell crank lever, thus allowing the latch 104 to be swung inward into active position by the spring 123. When the lever 106 is lifted, therefore, to throw the lace inserting mechanism into operation it is engaged by the latch and retained in its upper position until the latch is again tripped in the manner heretofore described.

In order to prevent the throwing of the mechanism which rotates the carrier 3 into operation during the operation of the lace inserting mechanism, a locking lever 124 is provided for preventing the operation of the controlling lever 13 when the lace inserting mechanism is in operation. One end of this locking lever is arranged to engage the upper end of the bell crank lever 11 to which the locking bolt 8 is connected (Fig. 1). The other end of the lever is provided with a slot which is engaged by a pin 125 projecting from the end of the arm 112 through which the latch 104 is tripped to throw the lace inserting mechanism out of operation. When the arm 112 is depressed to trip the latch 104 and throw the lace inserting mechanism out of operation, the locking lever 124 is swung into position to disengage the bell crank lever 11 so that the controlling lever 13 may be operated to unlock the carrier 3 and throw the driving mechanism therefor into operation. As soon as the carrier 3 starts to rotate, the bar 109 passes away from the bell crank lever 110, thus releasing the arm 112 so that it is free to return to normal position under the influence of the spring 123. At this time the end of the locking lever 124 will rest upon the upper end of the bell crank lever 11, and thus prevent the return of the arm 112 and locking lever to normal position. When the carrier 3 has completed a half revolution, and the locking bolt 8 has entered the recess 9, the upper end of the bell crank lever 11 passes from under the end of the locking lever 124, and the lever is swung into locking position under the influence of the spring 123.

In the main views of the drawings, the parts are shown in the position which they occupy after the driving mechanism for the carrier 3 has been thrown into operation, the carrier has made a half revolution and has been locked in position, and the driving mechanism for the lace inserting devices has been thrown into action and the shaft 15 has started forward through a fractional part of a revolution. By the revolution of the carrier 3 the upper carrying slide 1 has been brought into position to present the upper carried thereon to the lace inserting mechanism, and by the partial revolution of shaft 15 the feed pawl 68 has been reciprocated and has operated to advance the slide 1 into position to bring the first eyelet locating spindle into register with the needle 56. During each revolution of the shaft 15 the needle 56 is reciprocated, and the thread carrier is operated to lay the thread in the hook of the needle, and the slide feeding pawl is operated to bring the succeeding eyelet locating spindle into register with the needle. At each reciprocation of the needle one of the eyelet locating spindles is pushed down in its socket, and after each upward movement of the needle the slide 1 is moved forward. These operations continue until the lace inserting mechanism is thrown out of operation by the engagement of the bar 109 with the bell crank lever 110, as above described. When this occurs, a number or all of the eyelet locating spindles have been pushed down in their sockets, and the slide 1 has been moved forward in its guideway to bring the last pair of eyelet holes through which the lace is to be inserted into register with the needle.

During the time that the lacing mechanism has been thus operating to insert a lace in the upper carried by the slide 1, the operator has removed the laced upper from the slide 2 and has placed an unlaced upper in position upon the eyelet locating spindles and has secured the upper in position by the upper clamp. The operator then throws the mechanism for operating the carrier 3 into operation, and the carrier is given a half revolution to bring the slide 2 into position to present the upper carried thereby to the lace inserting devices, and to bring the slide 1 into position to receive another upper.

During the travel of the slide 1 from the position indicated in the drawings to the position of the slide 2 indicated in the drawings, the slide 1 is retracted and the eyelet locating spindles are brought into position over a spring operated lever which acts to force the spindles up into normal position as soon as the upper holding clamp is operated to release the upper and allow it to move up away from the upper face of the table.

Figure 2:
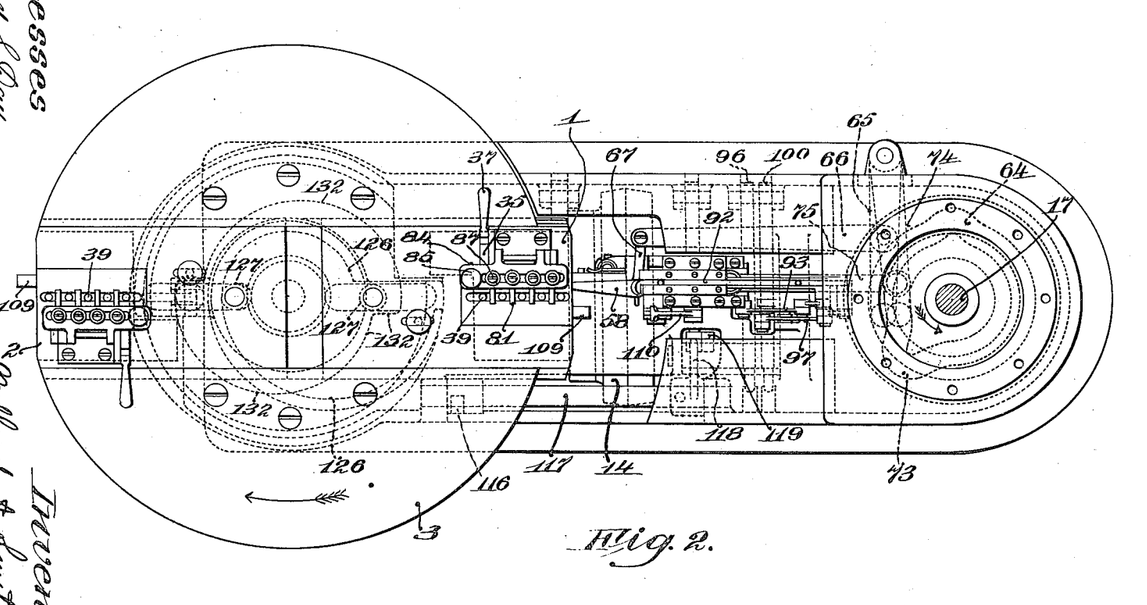
Fig. 2 is a plan view of the machine.

The means for retracting the slide consists of a stationary cam 126 arranged to act upon a roll 127 secured to the under side of the slide (Figs. 1, 2, 8, 12 and 13). The eyelet locating spindles are returned to normal position by a lever 128 which is pivoted at 129, and is provided at its outer end with a spindle engaging surface 130 arranged to underlie the spindles when they are brought into the position of the slide 2 (Fig. 2). The lever 128 is acted upon by a spring 131, which tends to swing the lever into the position to move the eyelet locating spindles upward, as indicated in Fig. 1. The lever 128 is swung downward to carry the spindle engaging surface 130 out of the path of the depressed spindles as the spindles are brought from the position of slide 1 to the position of slide 2, by one of two cam surfaces 132 formed in the cam disk 10. As the slide 1, for instance, travels from the position indicated in Fig. 2 to the position of slide 2 in Fig. 2, one of the cam surfaces 132 acts to force the lower end of the lever 128 inward, thus swinging the spindle engaging surface 130 out of the path of the depressed spindles. As the spindles come into position above the surface 130 of the lever 128, the end of the cam surface 132 passes the lower end of the lever, so that this end of the lever is free to swing outward under the influence of the spring 131. The eyelet locating spindles are now pressed upward, and as soon as the upper is released by the release of the cam 32, the spindles will be carried into normal position, lifting the upper from the surface of the table 3. The upper may now be removed, and a new upper placed in position on the spindles, preparatory to the next movement of the carrier 3.

Having set forth the nature and object the invention, and specifically described one form of mechanism in which the invention may be embodied, what is claimed is:—

1. A machine for lacing shoe uppers, having, in combination, mechanism for inserting lacing in the eyelet holes of uppers to connect the sides of the upper together, a plurality of upper carriers, means for bringing the upper carriers successively to the lace inserting mechanism, and mechanism for operating the lace inserting mechanism to lace together the sides of the upper, substantially as described.

2. A machine for lacing shoe uppers, having, in combination, mechanism for inserting lacing in the eyelet holes of uppers to connect the sides of the upper together, a plurality of upper carrying devices, means for bringing the upper carrying devices successively to the lace inserting mechanism, and mechanism thrown into operation by the bringing of an upper to the lace inserting mechanism for operating the lace inserting mechanism to lace together the sides of the upper, substantially as described.

3. A machine for lacing shoe uppers, having, in combination, mechanism for inserting lacing in the eyelet holes of uppers to connect the sides of the upper together, an upper carrying device, devices on the upper carrier for locating the pairs of eyelet holes in the upper, and means for bringing the locating devices into register with the lace inserting mechanism, substantially as described.

4. A machine for lacing shoe uppers, having, in combination, mechanism for inserting lacing in the eyelet holes of uppers to connect the sides of the upper together, a carrier, a plurality of upper carriers on the carrier each provided with devices for locating the pairs of eyelets of the upper, and mechanism for operating the carrier to bring the upper carriers successively to the lace inserting mechanism, substantially as described.

5. A machine for lacing shoe uppers, having, in combination, mechanism for inserting lacing in eyelet holes of an upper successively, devices for engaging and locating the pairs of eyelets of an upper, and means for bringing the pairs of eyelet holes successively to the lace inserting mechanism, substantially as described.

6. A machine for lacing shoe uppers, having, in combination, mechanism for inserting lacing in eyelet holes of an upper successively, devices for locating the pairs of eyelet holes of an upper adjustable for different spaced eyelets, and means for bringing the pairs of eyelet holes successively to the lace inserting mechanism, substantially as described.

7. A machine for lacing shoe uppers, having, in combination, mechanism for inserting lacing in the eyelet holes of uppers to connect the sides of the upper together, and an upper carrier provided with a series of devices for engaging and locating the pairs of eyelets in which the lace is to be subsequently inserted, substantially as described.

8. A machine for lacing shoe uppers, having, in combination, an upper carrier provided with a series of spindles for engaging and locating the pairs of eyelet holes, and independent devices for inserting lacing in the pairs eyelet holes to connect the sides of the upper together, substantially as described.

9. A machine for lacing shoe uppers, having, in combination, an upper carrier provided with a series of spindles for engaging and locating the pairs of eyelet holes of an upper, lace inserting mechanism including a needle, and mechanism for bringing the spindles successively into line with the needle, substantially as described.

10. A machine for lacing shoe uppers, having, in combination, mechanism for inserting lacing in the eyelet holes of uppers to connect the sides of the upper together, a plurality of upper carriers, mechanism for bringing the carriers successively to the lace inserting mechanism, and mechanism for advancing the upper step by step during the operation of the lace inserting mechanism, substantially as described.

11. A machine for lacing shoe uppers, having, in combination, mechanism for inserting lacing in the eyelet holes of uppers to connect the sides of the upper together, a carrier, a plurality of upper carriers on the carrier, mechanism for operating the carrier to bring the upper carriers successively to the lace inserting mechanism, and mechanism for advancing the upper carriers step by step during the operation of the lace inserting mechanism, substantially as described.

12. A machine for lacing shoe uppers, having, in combination, an upper carrier provided with adjustable eyelet locating devices, teeth adjustable with the eyelet locating devices, and a feed pawl for engaging said teeth and intermittently feeding the eyelet locating devices, substantially as described.

13. A machine for lacing shoe uppers, having, in combination, an upper carrier provided with a plurality of blocks, eyelet locating spindles adjustably mounted in said blocks, a tooth on each block, a feed pawl operating on said tooth, and means for adjusting said blocks, substantially as described.

14. A machine for lacing shoe uppers, having, in combination, an upper carrier provided with a plurality of longitudinally movable eyelet locating spindles, lace inserting devices including a reciprocating needle, and mechanism for bringing the spindles successively into register with the needle, substantially as described.

15. A machine for lacing shoe uppers, having, in combination, an upper holder provided with a plurality of longitudinally movable eyelet locating spindles, substantially as described.

16. A machine for lacing shoe uppers, having, in combination, an upper holder provided with a plurality of adjustable blocks, and a longitudinally movable eyelet locating spindle mounted in each block, substantially as described.

17. A machine for lacing shoe uppers, having, in combination, an upper holder provided with a plurality of adjustable blocks, a longitudinally movable eyelet locating spindle mounted in each block, and means for simultaneously adjusting the blocks to vary the spacing of the spindles, substantially as described.

18. A machine for lacing shoe uppers, having, in combination, lace inserting mechanism, an upper carrier, means for moving the carrier to and from the lace inserting mechanism, and means thrown into operation upon the bringing of the carrier to the lace inserting mechanism for operating the lace inserting mechanism to lace together the sides of the upper, substantially as described.

19. A machine for lacing shoe uppers, having, in combination, mechanism for inserting lacing in eyelet holes successively, an upper carrier, means for moving the carrier to and from the lace inserting mechanism, means thrown into operation upon the bringing of the carrier to the lace inserting mechanism for operating the lace inserting mechanism and for feeding the upper to bring pairs of eyelets successively to the lace inserting mechanism, and means controlled by the feed of the upper for throwing the lace inserting mechanism out of operation, substantially as described.

20. A machine for lacing shoe uppers, having, in combination, devices for inserting lacing in the eyelet holes of an upper, means for feeding the upper to bring the pairs of eyelet holes therein successively to the lace inserting devices, and means controlled by the feed of the upper for throwing the lace inserting device out of operation, substantially as described.

21. A machine for lacing shoe uppers, having, in combination, devices for inserting lacing in the eyelet holes of an upper, means for feeding the upper to bring the pairs of eyelet holes therein successively to the lace inserting devices, and means for arresting the operation of the lace inserting devices adjustably to vary the number of eyelet holes in which the lace is inserted, substantially as described.

22. A machine for lacing shoe uppers, having, in combination, devices for inserting lacing in the eyelet holes of an upper, an upper carrier, means for intermittently advancing the upper carrier to bring the pairs of eyelet holes successively to the lace inserting devices, a bar on the carrier, and means for throwing the inserting devices out of action operated by the bar, substantially as described.

23. A machine for lacing shoe uppers, having, in combination, devices for inserting lacing in the eyelet holes of an upper, an upper carrier provided with eyelet locating devices adjustable for different spacing of eyelets, means for intermittently advancing the carrier to bring the pairs of eyelets successively to the lace inserting devices, a bar adjustable with the locating devices, and means for throwing the lace inserting devices out of action operated by the bar, substantially as described.

24. A machine for lacing shoe uppers, having, in combination, devices for inserting lacing in the eyelet holes of an upper, an upper carrier provided with eyelet locating devices adjustable for different spacing of eyelets, means for intermittently advancing the carrier to bring the pairs of eyelets successively to the lace inserting devices, a bar, means for connecting the bar with any one of the locating devices, and means for throwing the lace inserting devices out of action operated by the bar, substantially as described.

25. A machine for lacing shoe uppers, having, in combination, an upper carrier provided with eyelet locating devices, a shoulder on the carrier corresponding to each locating device, a positioning stop, and means for advancing the carrier to bring the shoulders thereon successively against the positioning stop, substantially as described.

26. A machine for lacing shoe uppers, having, in combination, an upper carrier provided with eyelet locating devices adjustable for different spacing of eyelets, a shoulder on the carrier corresponding to each eyelet locating device and adjustable therewith, a positioning stop, and means for advancing the carrier to bring the shoulders successively against the positioning stop, substantially as described.

27. A machine for lacing shoe uppers, having, in combination, mechanism operating to lace together the sides of an upper, and means for feeding uppers successively to the lace inserting mechanism, substantially as described.

28. A machine for lacing shoe uppers, having, in combination, mechanism operating to lace together the sides of an upper, means for feeding uppers to the lace inserting mechanism, and means for feeding the pairs of eyelets successively to the lace inserting devices, substantially as described.

29. A machine for lacing shoe uppers, having, in combination mechanism for inserting lacing in the eyelet holes of uppers to connect the sides of the upper together, mechanism for bringing uppers successively to the lace inserting mechanism, and mechanism for advancing the uppers step by step during the operation of the lace inserting mechanism, substantially as described.

30. A machine for lacing shoe uppers, having, in combination, lace inserting mechanism, means for feeding uppers to the lace inserting mechanism, and means thrown into operation upon the bringing of an upper to the lace inserting mechanism for operating the lace inserting mechanism to lace together the sides of the upper, substantially as described.

31. A machine for lacing shoe uppers, having, in combination, a series of spindles for engaging and locating the pairs of eyelet holes, and independent devices for inserting lacing in the pairs of eyelet holes to connect the sides of the upper together, substantially as described.

32. A machine for lacing shoe uppers, having, in combination, mechanism for inserting lacing in the eyelet holes of an upper successively, including a hooked needle and a looper, and means acting to sever the thread between the last pair of eyelet holes and the looper at the completion of the lacing operation, substantially as described.

33. A machine for lacing shoe uppers, having, in combination, stitch forming mechanism including a hooked needle, a looper, means for severing the thread between the looper and work at the completion of the lacing operation and for holding the end of the supply thread, and mechanism for bringing pairs of eyelets successively into position for the passage of the needle, substantially as described.

34. A machine for lacing shoe uppers, having, in combination, stitch forming mechanism including a hook needle and a looper and mechanism acting to automatically sever the thread between the looper and the work and draw the severed end through the previous loop at the completion of the stitch forming operation, substantially as described.

35. A machine for lacing shoe uppers, having, in combination, devices for engaging and locating eyelet holes, said devices permitting a plurality of pairs of eyelet holes to be simultaneously engaged and located thereby, and independent devices for inserting lacing in the pairs of eyelet holes to connect the sides of the upper together, substantially as described.

36. A machine for lacing shoe uppers, having, in combination, devices for holding a shoe upper, mechanism for inserting lacing in the eyelet holes of the upper successively including a hooked needle and a looper, means acting to sever the thread between the last pair of eyelet holes and the looper at the completion of the lacing operation and for holding the thread in position to be engaged with the needle by the looper, substantially as described.

37. A machine for lacing shoe uppers, having, in combination, mechanism for inserting lacing in the eyelet holes of an upper successively including a hooked needle and a looper, and means for drawing off a loop of thread between the looper and the last pair of eyelet holes and for severing the thread, substantially as described.

38. A machine for lacing shoe uppers, having, in combination, means for engaging and locating eyelet holes, said means permitting a plurality of pairs of eyelet holes to be simultaneously engaged and alined thereby, and means for inserting the lacing cord successively in the pairs of eyelet holes, substantially as described.

In testimony whereof I affix my signature, in presence of two witnesses.

WILLARD A. SMITH.

Witnesses:
 IRA L. FISH,
 N. D. MCPHAIL.